(12) United States Patent
Bacon et al.

(10) Patent No.: US 8,513,647 B1
(45) Date of Patent: Aug. 20, 2013

(54) QUANTUM COMPUTATIONAL DEVICE EMPLOYING MULTI-QUBIT STRUCTURES AND ASSOCIATED SYSTEMS AND METHODS

(75) Inventors: Dave M Bacon, Seattle, WA (US); Gregory M Crosswhite, Seattle, WA (US); Steven T Flammia, Pasadena, CA (US)

(73) Assignee: University of Washington Through its Center for Commercialization, Seattle, WA (US)

( * ) Notice: Subject to any disclaimer, the term of this patent is extended or adjusted under 35 U.S.C. 154(b) by 53 days.

(21) Appl. No.: 13/083,363

(22) Filed: Apr. 8, 2011

Related U.S. Application Data

(60) Provisional application No. 61/322,454, filed on Apr. 9, 2010, provisional application No. 61/473,424, filed on Apr. 8, 2011.

(51) Int. Cl.
*H01L 27/30* (2006.01)
(52) U.S. Cl.
USPC ............................................ 257/30

(58) Field of Classification Search
USPC ...................... 257/30–31; 438/2–3
See application file for complete search history.

(56) References Cited

U.S. PATENT DOCUMENTS

| | | | | |
|---|---|---|---|---|
| 7,135,701 B2* | 11/2006 | Amin et al. | ...................... | 257/31 |
| 7,253,654 B2* | 8/2007 | Amin | ................... | 326/3 |
| 7,418,283 B2* | 8/2008 | Amin | .................... | 505/170 |
| 7,639,035 B2* | 12/2009 | Berkley | ..................... | 326/2 |
| 2003/0094606 A1* | 5/2003 | Newns et al. | ................... | 257/31 |
| 2003/0224944 A1* | 12/2003 | Il'ichev et al. | ................. | 505/170 |
| 2005/0250651 A1* | 11/2005 | Amin et al. | ................... | 505/846 |
| 2005/0256007 A1* | 11/2005 | Amin et al. | ................... | 505/170 |
| 2006/0097746 A1* | 5/2006 | Amin | .................... | 326/6 |
| 2006/0097747 A1* | 5/2006 | Amin | .................... | 326/6 |
| 2006/0248618 A1* | 11/2006 | Berkley | ................. | 977/700 |

* cited by examiner

*Primary Examiner* — Nathan Ha
(74) *Attorney, Agent, or Firm* — Wilson Sonsini Goodrich & Rosati

(57) ABSTRACT

A quantum computational (QC) device includes a multi-qubit (MQ) structure and another MQ structure coupled to the MQ structure. The MQ structure is arranged to provide an adiabatic quantum computation by application of an initial Hamiltonian operator. The other MQ structure is arranged to provide another adiabatic quantum computation by application of another Hamiltonian operator that is spatially different than the initial Hamiltonian operator.

15 Claims, 7 Drawing Sheets

(A)            (B)

(C)            (D)

QUANTUM COMPUTATIONAL DEVICE EMPLOYING MULTI-QUBIT STRUCTURES AND ASSOCIATED SYSTEMS AND METHODS

RELATED APPLICATIONS

This application claims priority to U.S. Provisional Patent Application Ser. No. 61/322,454, entitled Quantum Computational Device Employing Multi-Qubit Structures and Associated Systems and Methods, filed Apr. 9, 2010 and U.S. Provisional Patent Application Ser. No. 61/473,424, entitled Adiabatic Quantum Transistors, filed Apr. 8, 2011, which are both hereby incorporated by reference.

STATEMENT REGARDING FEDERAL FUNDING

This invention was made with government support under grant number FA9550-09-1-0044 awarded by Air Force Office of Scientific Research and grant numbers 0829937 and 0803478 awarded by National Science Foundation. The government has certain rights in the invention.

TECHNICAL FIELD

The present invention is directed generally to quantum computational devices, and in particular, but not necessarily exclusively, to a quantum computational device employing, for example, charge-, flux-, or phase-based superconducting qubit structures.

BACKGROUND

Modern computers process their information in a strictly classical manner: that is the evolution of the information in the computer is effectively described by the laws of classical physics. A quantum computer is a device in which the information is made to obey the laws of quantum physics. This shift in how the information in these devices behaves creates a similar shift in the power of these machines. Quantum computers can, for example, efficiently factor numbers—a task that is believed to not be tractable on a classical computer. The promise of quantum computers is that they can exploit quantum effects like interference, superposition, and quantum entanglement to offer computational advantage over classical computers. Large quantum computers, however, are difficult to build in large part because quantum systems like to become classical through the process known as decoherence.

The problem of decoherence is ubiquitous in quantum computer designs. Theoretically decoherence does not pose a fundamental barrier. A famous theorem of quantum computing theory, the quantum threshold theorem, asserts that if the decoherence is slow enough and enough control is maintained over a quantum system, then one can build a large scale quantum computer by using a form of redundancy known as quantum error correction. The requirements for this theorem are, however, daunting. Of particular import are the errors created by the controllers of the quantum systems. These are often the largest errors in the system, and are largely responsible for quantum information losing its coherence. Most of these errors arise from the difficulty of precisely manipulating control fields that interact with the device. Precise laser pulses and voltage waveforms, for example, accompany the vast majority of quantum computer designs.

In order to overcome the precise timing and control issues of quantum computing, a variety of models of quantum computing have been developed. One of the most promising is known as adiabatic quantum computing. In adiabatic quantum computing one engineers a many-body quantum system in such a way as to drag an initial, easily prepared, ground state of a quantum device to a final ground state that holds the result of a quantum computation. It has been shown that this model is equivalent in power to the standard quantum circuit model of quantum computing. These models have the important property of not suffering from timing errors: one need only apply the quantum computation on a slow enough timescale and not worry about the actual fluctuations in control fields during this evolution. However, constructions for this equivalence all suffer from considerable problems. One major problem is that these constructions are not modular. In particular, without measuring the quantum system devices constructed in an adiabatic quantum computer the constructions cannot be strung together to operate one after the other. A second problem is that none of these models can be shown to be fault-tolerant: there is no known way to make an adiabatic quantum computer tolerant to all the processes of decoherence and error. Adiabatic quantum computers thus offer great potential for quantum computer construction, if the problems of modularity and fault-tolerance can be successfully overcome.

DETAILED DESCRIPTION

Figure 1:
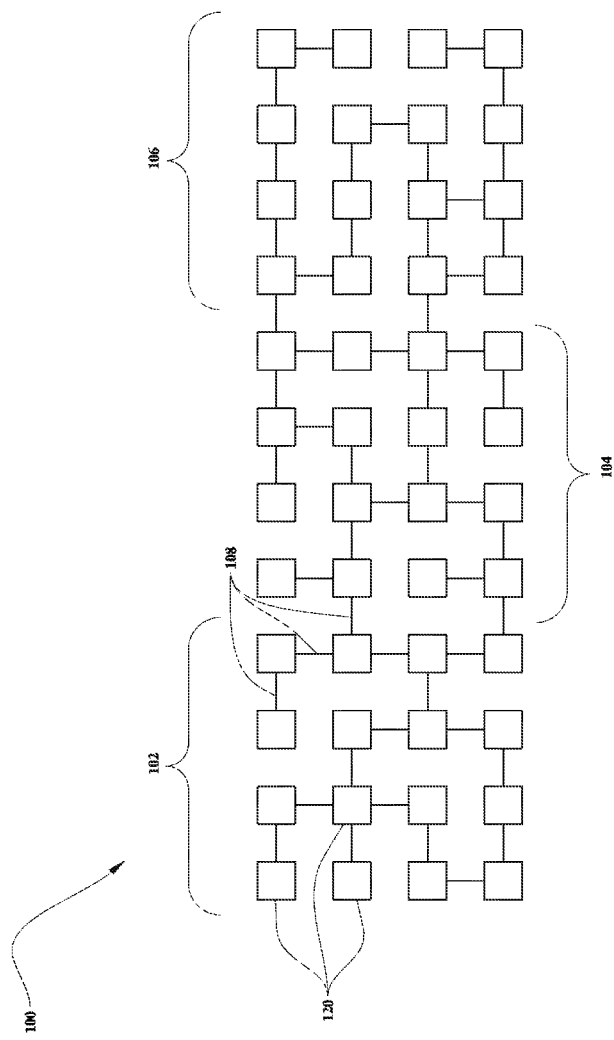
FIG. 1 is a schematic diagram of an embodiment of a quantum computational (QC) device.
Figure 2:
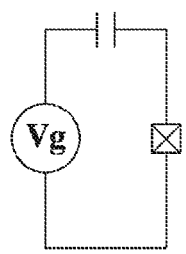
FIGS. 2A-2D are schematic diagrams of embodiments of qubits that may be employed in QC devices.
Figure 2:
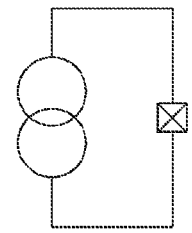
Figure 2:
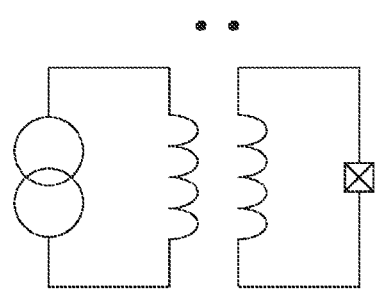
Figure 2:
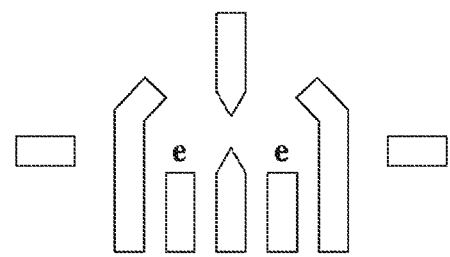

The present invention will now be described with references to the drawings. The invention, however, may be embodied in other forms and should not be construed as limited to the embodiments described below or illustrated in the drawings.

Briefly stated, the present invention is directed to a quantum computational (QC) device. The QC device includes multi-qubit (MQ) structures that are arranged to perform adiabatic quantum computations. In particular, the MQ structures are arranged to receive spatially-varied Hamiltonian operators such that the adiabatic quantum computations are performed at separate locations in the QC device. In some embodiments, Hamiltonian operators can be applied to separate MQ structures at different times. For example, the adiabatic quantum computations may be performed sequentially to provide an aggregate quantum computation. In one embodiment, MQ structures are modules and each module corresponds to a quantum computational sub circuit. Each sub circuit can be designed (1) to respond to a Hamiltonian operator and (2) to provide a state preparation, a measurement, a unitary circuit, or combination thereof to another sub circuit. In such a manner, a complex quantum computation can be carried out based on sub computations of lesser complexity.

As used herein, the term "adiabatic quantum computation" refers to a method of quantum computing where a time-dependent Hamiltonian operator is applied to a system on a schedule that is slow enough as to guarantee that the majority of the system evolution is dominated by conserving the energy eigenstates of the time-dependent Hamiltonian operator. The term "Hamiltonian operator" refers to the quantum mechanical description of the physics of the QC device and as such is determined by the actual physical structure enacting the quantum computation.

The term "aggregate computation" refers to the overall computation carried out by the quantum device, which is an aggregate of the adiabatic computations carried out by individual MQ structures. The term "spatially varied Hamiltonian operators" refers to one or more Hamiltonian operators that are applied to an MQ structure in a QC device but not to another MQ structure in that QC device.

FIG. 1 is a schematic diagram of an embodiment of a QC device 100. The QC device 100 includes MQ structure 102, MQ structure 104, MQ structure 106, and optionally additional or fewer MQ structures. For example, depending on the aggregate quantum computation to be carried out by the QC device 100, the MQ structure 106 could be omitted.

In some embodiments, MQ structures correspond to quantum computational sub-circuits. For example, the MQ structures 102, 104, and 106 can each be a module that corresponds to a different quantum computational sub-circuit (described further with reference to FIG. 6).

Embodiments of MQ structures can be coupled to adjacent MQ structures by way of interactions 108. Interactions are terms in a Hamiltonian resulting the design of the QC device.

Embodiments of MQ structures include individual qubits 120. The number of qubits within an MQ structure can vary depending on the aggregate computation to be performed by the QC device 100. For example, MQ structure can include additional or fewer qubits than those illustrated in the figures. In general, individual qubits 120 can interact with other qubits in a variety of ways, such as by way of the interactions 108.

FIGS. 2A-2D are schematic diagrams of embodiments of qubits that may be employed in QC devices. In some embodiments, qubits may include charge-based (FIG. 2A), phase-based (FIG. 2B), or flux-based (FIG. 2C) superconducting qubits. In other embodiments, quantum-dot based (FIG. 2D) qubits may be employed. While the qubits of FIGS. 2A-2D generally lend themselves to well-established semiconductor fabrication techniques, a skilled artisan would appreciate that other types of qubits could be employed. For example, individual qubits can include electron-spin-based qubits or nuclear-spin-based qubits.

Figure 3:
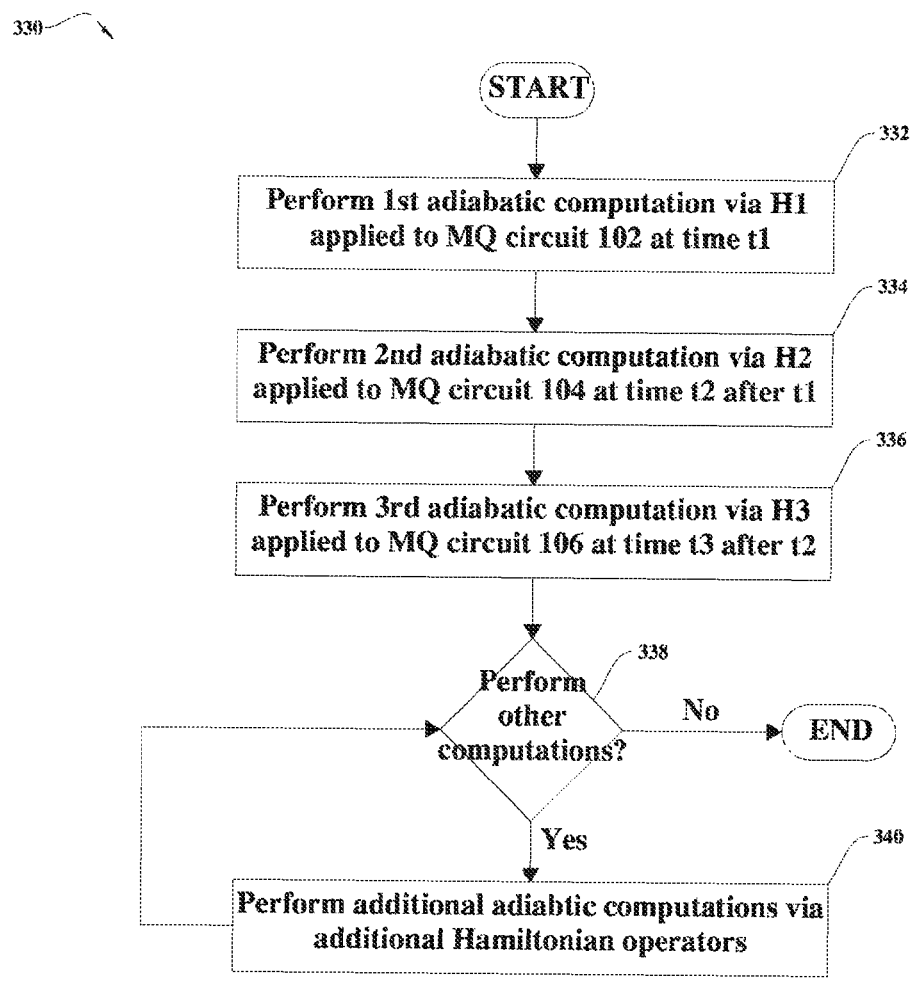
FIG. 3 is a flow diagram generally showing an embodiment of a method for employing a quantum computational device to perform an aggregate quantum computation.

FIG. 3 is a flow diagram generally showing an embodiment of a method 330 for employing a QC device to perform a quantum computation. In general, the method 330 employs spatially varied Hamiltonian operators to perform adiabatic computations. For purposes of illustration, the method 330 is described in conjunction with FIGS. 4A-4C (showing electric or magnetic fields applied to the QC device 100) and the QC device of FIG. 5 (showing interactions changed within the QC device 100). In other embodiments, the method 330 can be performed using different MQ structures and/or different arrangements of MQ structures than those illustrated in the figures. Also, embodiments of the method 330 can employ more or fewer Hamiltonian operators and/or adiabatic computations than those described in the method 330.

Figure 4:
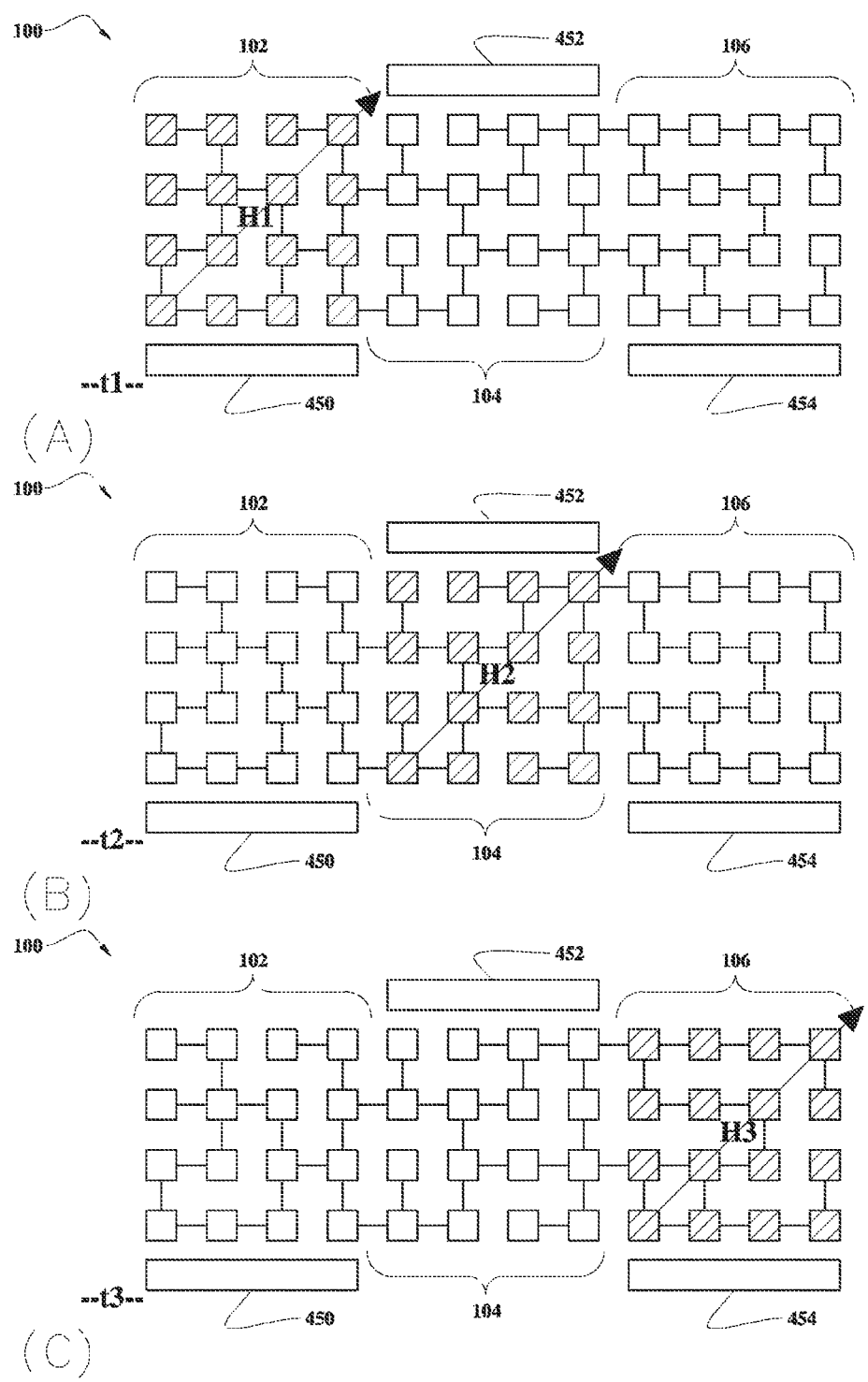
FIGS. 4A-4C are schematic diagrams generally showing an embodiment of quantum computational operations carried out by applying electric or magnetic fields within the QC device.
Figure 5:
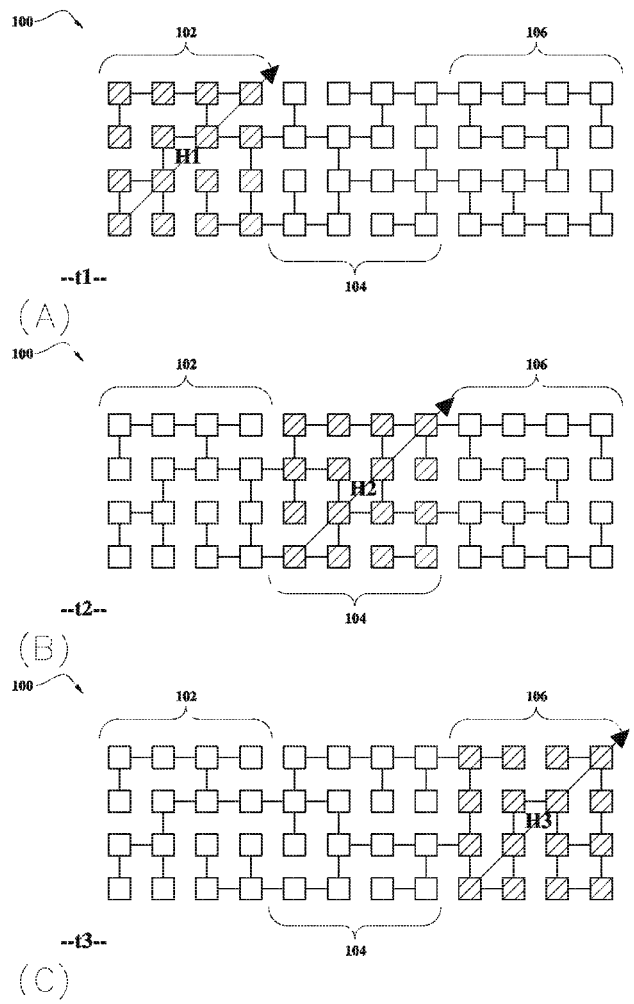
FIGS. 5A-5C are schematic diagrams generally showing an embodiment of quantum computational operations carried out by changing the interactions within the QC device.

At block 332, a first adiabatic computation is performed at time t1. The first adiabatic computation is carried out by applying a first Hamiltonian operator H1 to the MQ structure 102. Significantly, the first Hamiltonian operator H1 is not applied to the MQ structure 104 or the MQ structure 106. FIG. 4A shows the Hamiltonian operator H1 applied via a electric or magnetic field. External component 450, 452, and 454 may be on-chip components or other component that produces magnetic or electric fields. In an additional or alternative embodiment, FIG. 5A shows the Hamiltonian operation applied by changing the arrangement of interactions 108 within the MQ structure 102.

In either case, the application of the first Hamiltonian operator H1 can cause, for example, a state preparation, a measurement, a unitary circuit, or a combination thereof by the MQ structure 102. Such a state preparation, measurement, unitary circuit or combination thereof can be communicated to the MQ structure 104 prior to or at a time t2 after t1. For example, a state preparation, measurement, unitary circuit or combination thereof can be communicated by individual interactions 108 between the MQ structure 102 and the MQ structure 104.

Returning to FIG. 3, at block 334, a second adiabatic computation is performed at the time t2 after the time t1. For example, the time t2 may be x seconds or milliseconds after t1. The second adiabatic computation is carried out by applying a second Hamiltonian operator H2 to the MQ structure 104. Significantly, the second Hamiltonian operator H2 is not applied to the MQ structure 102 or the MQ structure 106. FIG. 4B shows the Hamiltonian operator H1 applied via an electric magnetic field. In an additional or alternative embodiment, FIG. 5B shows the Hamiltonian operation applied by changing the arrangement of interactions 108 within the MQ structure 104.

In either case, and similar to the first Hamiltonian operator H1, the second Hamiltonian operator H2 can cause a state preparation, measurement, unitary circuit, or combination thereof. Such a state preparation, measurement, unitary circuit, or combination thereof can be communicated to the MQ structure 106 prior to or at a time t3 after t2. The state preparation, measurement, unitary circuit, or combination thereof of the MQ structure 104 can be based on a state preparation, measurement, unitary circuit, or combination thereof carried out by the MQ structure 102.

Returning to FIG. 3, at block 336, a third adiabatic computation is performed at a time t3 after the time t3. For example, the time t3 may be x seconds or milliseconds after t2. The third adiabatic computation is carried out by applying a third Hamiltonian operator H3 to the MQ structure 106. Significantly, the third Hamiltonian operator H3 is not applied to the MQ structure 102 or the MQ structure 104. FIG. 4C shows the Hamiltonian operator H1 applied via an electric or magnetic field. In an additional or alternative embodiment, FIG. 5C shows the Hamiltonian operation applied by changing the arrangement of interactions 108 within the MQ structure 106.

In either case, and similar to the first and second Hamiltonian operators H1 and H2, the third Hamiltonian operator H2 can cause a state preparation, measurement, unitary circuit, or combination thereof. The state preparation, measurement, unitary circuit or combination thereof of MQ structure 106 can be based on a state preparation, measurement, unitary circuit, or combination thereof carried out by the MQ structure 104.

Returning to FIG. 3, at decision block 338, additional adiabatic quantum computations can be performed or the method can terminate. For example, at block 340, additional adiabatic computations can be carried out at one or more of the MQ structures 102, MQ structure 104, or MQ structure 106. Alternatively, other MQ structures (not illustrated in the Figures) may carry out adiabatic computations.

In some embodiments, the QC device 100 can be manufacture by well-established semiconductor fabrication techniques. Further, the MQ structures of the QC device 100 can be designed in a modularized fashion, using, for example, computer-aided-design (CAD) tools. In particular, each MQ structure can be designed based on a quantum computational sub circuit. The sub circuits can be the building blocks of a larger, aggregate quantum computational circuit that represents the entire MQ device. By allowing for such modularized circuit design, the design process of the MQ device is much simpler than the design processes of conventional qubit-based devices.

Figure 6:
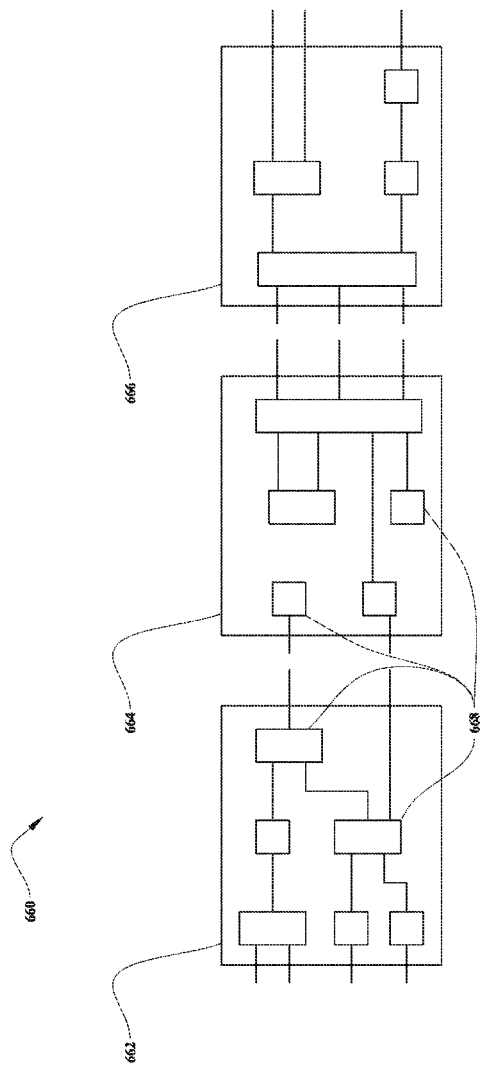
FIG. 6 is a schematic diagram of an embodiment of a quantum computational circuit that includes a plurality of quantum computational sub-circuits corresponding to modules of a QC device.

FIG. 6 is a schematic diagram of an embodiment of a quantum computational circuit 660 that can be used in the design/fabrication process of an MQ device. The computational circuit 660 includes a plurality of quantum computational sub-circuits 662, 664, and 666 corresponding to modules of a QC device. In particular, the sub circuit 662 corresponds to the MQ device 102 of FIG. 1, the sub circuit 664 corresponds to the MQ device 104 of FIG. 1, and the sub circuit 666 corresponds to the MQ device 106 of FIG. 1.

In general, each quantum computational sub circuit is designed to perform a computation. The corresponding MQ device is designed to reflect that computation. For example, the number, type, and interactions of an MQ device can be designed to reflect the quantum computation of a quantum computational sub circuit.

The sub circuits 662, 664, and 666 may include a variety of gates 668 having unitary or multiple inputs/outputs arranged for state preparation and/or state measurement. Internal to a sub circuit, the individual gates may provide state preparation and/or measurement. Also, external to a sub circuit, the sub circuit itself may provide the function of state preparation and/or measurement for another sub circuit.

Figure 7:
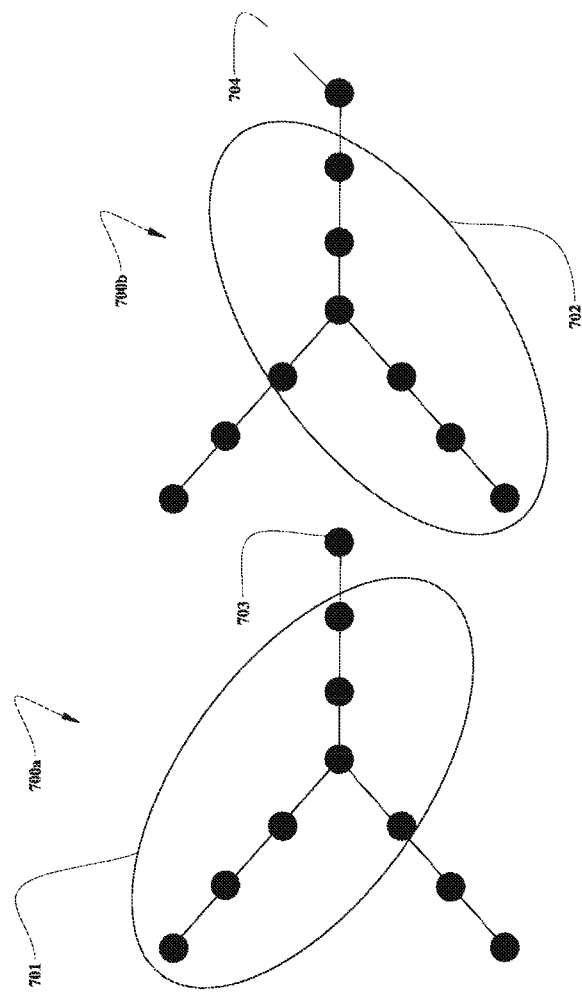
FIG. 7 is a schematic diagram generally showing an embodiment of a quantum state preparer where the location of the applied electric or magnetic field determines the state preparation produced by the QC device.

In some embodiments, a QC device can be used prepare different states depending on where the applied field is applied. FIG. 7 is a schematic diagram of a QC device 700 for achieving this preparation depending on the location of the applied electric or magnetic field. In this embodiment, if the applied electric or magnetic field is applied to the qubits in 701, then one particular state can be prepared, for example, at location 703, while if the applied electric or magnetic field is applied to the qubits in 702, then a different state can be prepared, for example, at location 704. These conditional state preparations can then be used to produce conditional unitary circuitry that depends on the spatial location of the applied electric or magnetic fields.

From the foregoing it will be appreciated that representative embodiments have been described for purposes of illustration. However, it is to be appreciated that well know characteristics often associated with quantum computational systems, methods, or the like not have been described to avoid unnecessarily obscuring the various embodiments. In addition, it is to be appreciated that various modifications may be made to the various embodiments, including adding or eliminating particular features.

The invention claimed is:

1. A quantum computational (QC) device that includes a first multi-qubit (MQ) structure and a second MQ structure coupled to the first MQ structure, the first MQ structure being arranged to provide an adiabatic quantum computation by application of an initial Hamiltonian operator, and the second MQ structure being arranged to provide another adiabatic quantum computation by application of another Hamiltonian operator that is spatially different than the initial Hamiltonian operator, wherein a first sub quantum computational circuit corresponds to the first MQ structure, and a second sub quantum computational circuit corresponds to the second MQ structure.

2. The QC device of claim 1, wherein the first MQ structure and the second MQ structure each include a plurality of individual qubits.

3. The QC device of claim 2, wherein the individual qubits include at least one of a charge-based, phase-based, or flux-based superconducting qubit.

4. The QC device of claim 2, wherein the individual qubits include a quantum-dot-based qubit.

5. The QC device of claim 2, wherein the individual qubits include at least one of an electron-spin-based qubit or a nuclear-spin-based qubit.

6. A method for operating the QC device of claim 1, comprising performing the adiabatic computation at the first MQ structure without performing the other adiabatic computation at the second MQ structure.

7. A method for manufacturing the QC device of claim 1, comprising designing a quantum computational circuit corresponding to the QC device, the quantum computational circuit including:
    the first sub quantum computational circuit corresponding to the first MQ structure; and
    a second sub quantum computational circuit corresponding to the second MQ structure.

8. A quantum computational circuit, comprising:
    a multi-qubit (MQ) structure and at least one other MQ structure that is coupled to the MQ structure, wherein the MQ structure corresponds to a quantum computational sub circuit and the other MQ structure corresponds to at least one other quantum computational sub circuit; and
    at least one component that is configured to perform an adiabatic quantum computation by applying a Hamiltonian operator H1 to the MQ structure without applying the Hamiltonian operator H1 to the other MQ structure.

9. The quantum computational circuit of claim 8, wherein each of the MQ structure and the other MQ structure include a plurality of individual qubits.

10. The quantum computational circuit of claim 8, wherein the Hamiltonian operator H1 is applied via an electric or magnetic field.

11. The quantum computational circuit of claim 8, wherein the Hamiltonian operator H1 is applied by controlling interactions within the MQ structure.

12. The quantum computational circuit of claim 8, further comprising yet another MQ structure that corresponds to yet another quantum computational sub circuit.

13. The quantum computational circuit of claim 8, wherein applying Hamiltonian operator H1 or another Hamiltonian operator H2 to the MQ structure can prepare one of two different quantum states.

14. A method for providing a quantum computational circuit, the method comprising:
    providing a multi-qubit (MQ) structure and at least one other MQ structure that is coupled to the MQ structure, wherein the MQ structure corresponds to a quantum computational sub circuit and the other MQ structure corresponds to at least one other quantum computational sub circuit; and providing at least one component that is configured to perform an adabiatic quantum computation by applying a Hamiltonian operator to the MQ structure without applying the Hamiltonian operator to the other MQ structure.

15. The method of claim 14, wherein providing the MQ structure and the other MQ structure includes modularizing the quantum computational circuit into the sub circuit and the other sub circuit.

* * * * *